United States Patent
Harris

(10) Patent No.: US 8,050,238 B2
(45) Date of Patent: Nov. 1, 2011

(54) METHOD AND APPARATUS FOR IMPROVING NETWORK ACCESS THROUGH MULTI-STAGE SIGNALING

(75) Inventor: John M. Harris, Glenview, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 525 days.

(21) Appl. No.: 12/250,623

(22) Filed: Oct. 14, 2008

(65) Prior Publication Data

US 2009/0168850 A1 Jul. 2, 2009

Related U.S. Application Data

(60) Provisional application No. 61/018,039, filed on Dec. 31, 2007.

(51) Int. Cl.
*H04B 7/216* (2006.01)
(52) U.S. Cl. ..................................................... 370/335
(58) Field of Classification Search .................. None
See application file for complete search history.

(56) References Cited

U.S. PATENT DOCUMENTS

| 7,047,031 | B2 | 5/2006 | Rosen et al. | |
|---|---|---|---|---|
| 7,206,332 | B2* | 4/2007 | Kwan et al. | 370/441 |
| 2006/0292988 | A1* | 12/2006 | Yuen et al. | 455/62 |
| 2007/0211787 | A1 | 9/2007 | Harris et al. | |
| 2007/0253388 | A1* | 11/2007 | Pietraski | 370/338 |
| 2008/0070610 | A1 | 3/2008 | Nishio | |
| 2008/0233964 | A1* | 9/2008 | McCoy et al. | 455/450 |

FOREIGN PATENT DOCUMENTS

JP 2004215104 7/2004

* cited by examiner

*Primary Examiner* — Anh-Vu Ly

(57) ABSTRACT

Various embodiments are described for improving network access through multi-stage signaling. Logic flow diagram 10 in FIG. 1 depicts functionality performed by a wireless communication system in accordance with multiple embodiments of the present invention. A network node configures (12) a shared indicator code for indicating an emergency and/or a group call access occurring in that sector. Thus, when an MS performs an emergency access, it transmits (13) an access signal on both the shared indicator code and on a randomly selected code. This more quickly notifies the network that there is at least one MS in the sector. Once aware that such an access is occurring in that sector, the network may (14) provision additional access resources, estimate the number of MSs transmitting based on the received power on that indicator code, start backing off non-emergency traffic, and/or begin transmitting communication without waiting for authentication to complete.

17 Claims, 4 Drawing Sheets

METHOD AND APPARATUS FOR IMPROVING NETWORK ACCESS THROUGH MULTI-STAGE SIGNALING

FIELD OF THE INVENTION

The present invention relates generally to wireless communication systems and, in particular, to improving network access through multi-stage signaling.

BACKGROUND OF THE INVENTION

In communication systems that are being developed today, such as those based on the IEEE (Institute of Electrical and Electronics Engineers) 802.16 air interface or the WiMAX air interface, emergency calls (e.g., "911" calls) and public safety-related calls may experience delays or call latencies that are particularly undesirable given the time critical situations in which many of these calls are made. One reason for this is that these communication networks may not know that a given call is an emergency/public safety-related call until the mobile station (MS) makes two or three transmissions to the network within a contention phase of the MS's ranging process. The ranging codes used by MSs could be partitioned into emergency and non-emergency groups to enable the network to know sooner in the ranging process that a particular call was an emergency call (i.e., only an emergency caller would use a ranging code from the emergency group). However, partitioning codes in such a manner can adversely affect system performance in situations in which signaling of one type floods the system. For example, there may not be enough codes in the emergency group for a large number of emergency responders to simultaneously access the network, while at the same time the group of non-emergency codes may be under-utilized. Thus, new techniques able to better service at least some of the emergency/public safety-related calls would be desirable.

Specific embodiments of the present invention are disclosed below with reference to FIGS. 1-5. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the signaling flow diagrams and/or the logic flow diagrams above are described and shown with reference to specific signaling exchanged and/or specific functionality performed in a specific order, some of the signaling/functionality may be omitted or some of the signaling/functionality may be combined, sub-divided, or reordered without departing from the scope of the claims. Thus, unless specifically indicated, the order and grouping of the signaling/functionality depicted is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Figure 1:
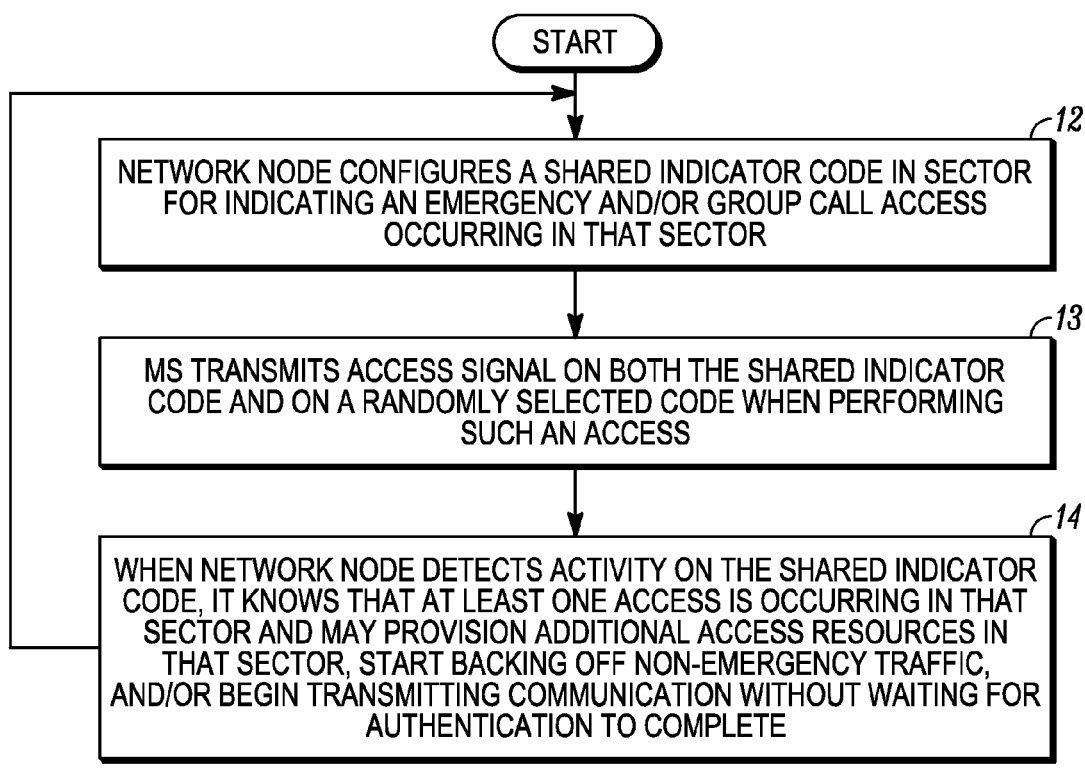
FIG. 1 is a logic flow diagram of functionality performed by a wireless communication system in accordance with multiple embodiments of the present invention.

Various embodiments are described for improving network access through multi-stage signaling. Logic flow diagram 10 in FIG. 1, depicts functionality performed by a wireless communication system in accordance with multiple embodiments of the present invention. A network node configures (12) a shared indicator code for indicating an emergency and/or a group call access occurring in that sector. Thus, when an MS performs an emergency access, it transmits (13) an access signal on both the shared indicator code and on a randomly selected code. This more quickly notifies the network that there is at least one MS in the sector. Once aware that such an access is occurring in that sector, the network may (14) provision additional access resources, estimate the number of MSs transmitting based on the received power on that indicator code, start backing off non-emergency traffic, and/or begin transmitting communication without waiting for authentication to complete.

In a generalization of many network node embodiments of the present invention, a network node transmits signaling that indicates a shared spreading channel code and then receives an initial access signal from each of a plurality of remote units via the shared spreading channel code. The network node also receives from each of the plurality of remote units a subsequent access signal using a different spreading channel code. In response to the subsequent access signals, the network node then transmits signaling to establish a private link with each of the plurality of remote units.

In a generalization of many remote unit embodiments of the present invention, a remote unit of a plurality of remote units receives signaling from a network node that indicates a shared spreading channel code for the plurality of remote units. The remote unit transmits an initial access signal using the shared spreading channel code and also transmits a subsequent access signal using a different spreading channel code in order to trigger the establishment of a private link between the remote unit and the network node.

Figure 2:
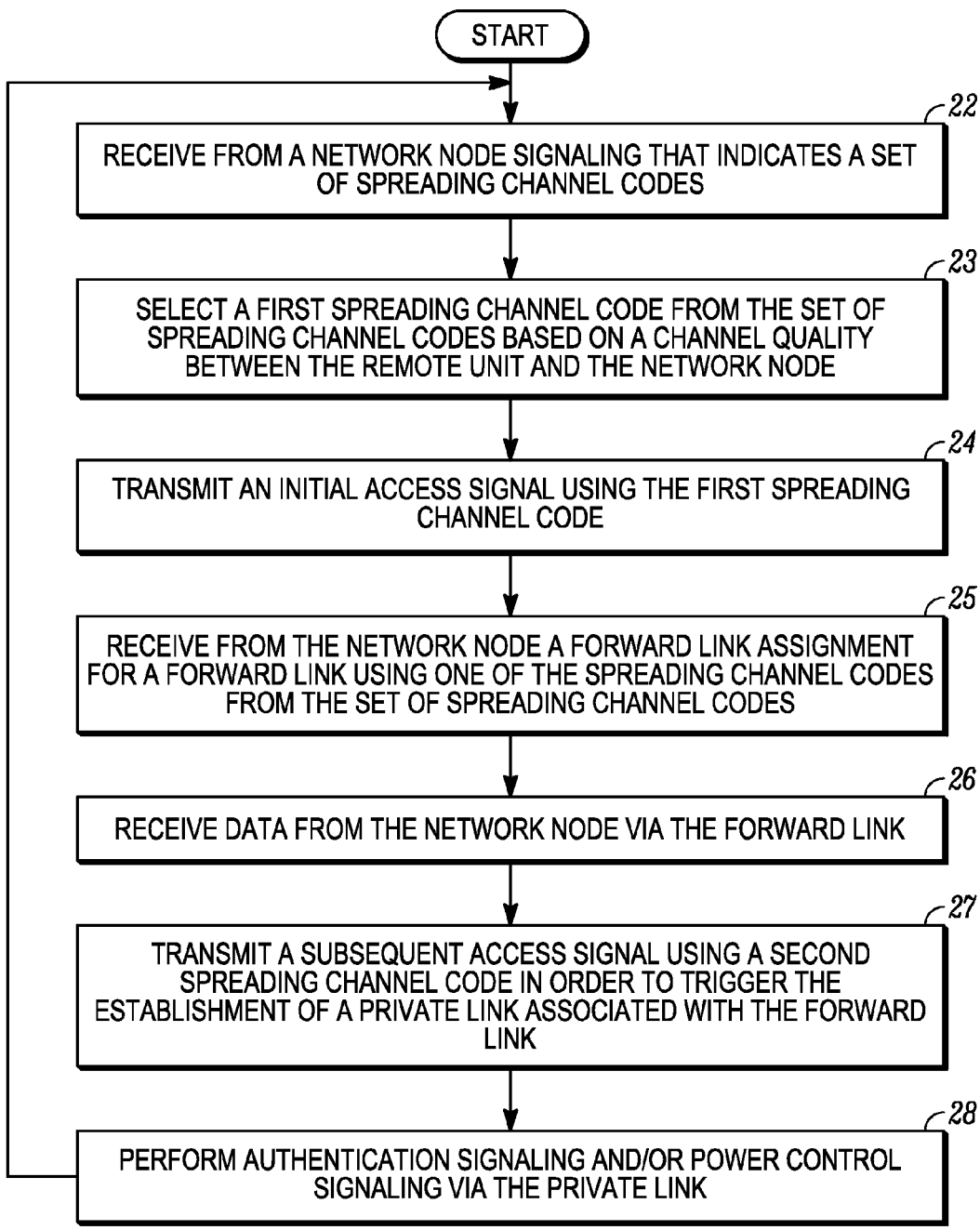
FIG. 2 is a logic flow diagram of functionality performed by a remote unit in accordance with multiple embodiments of the present invention.
Figure 3:
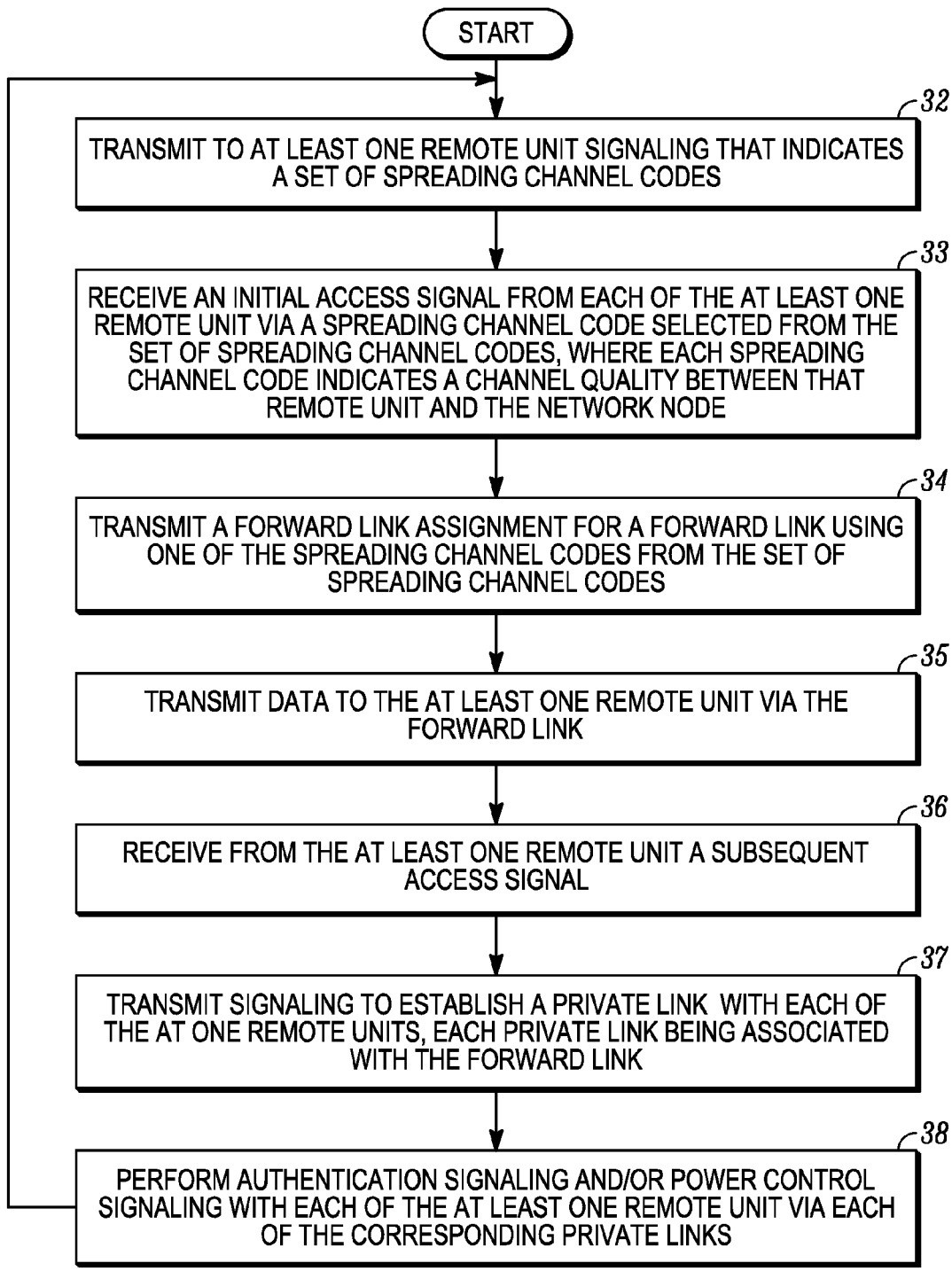
FIG. 3 is a logic flow diagram of functionality performed by a network node in accordance with multiple embodiments of the present invention.
Figure 4:
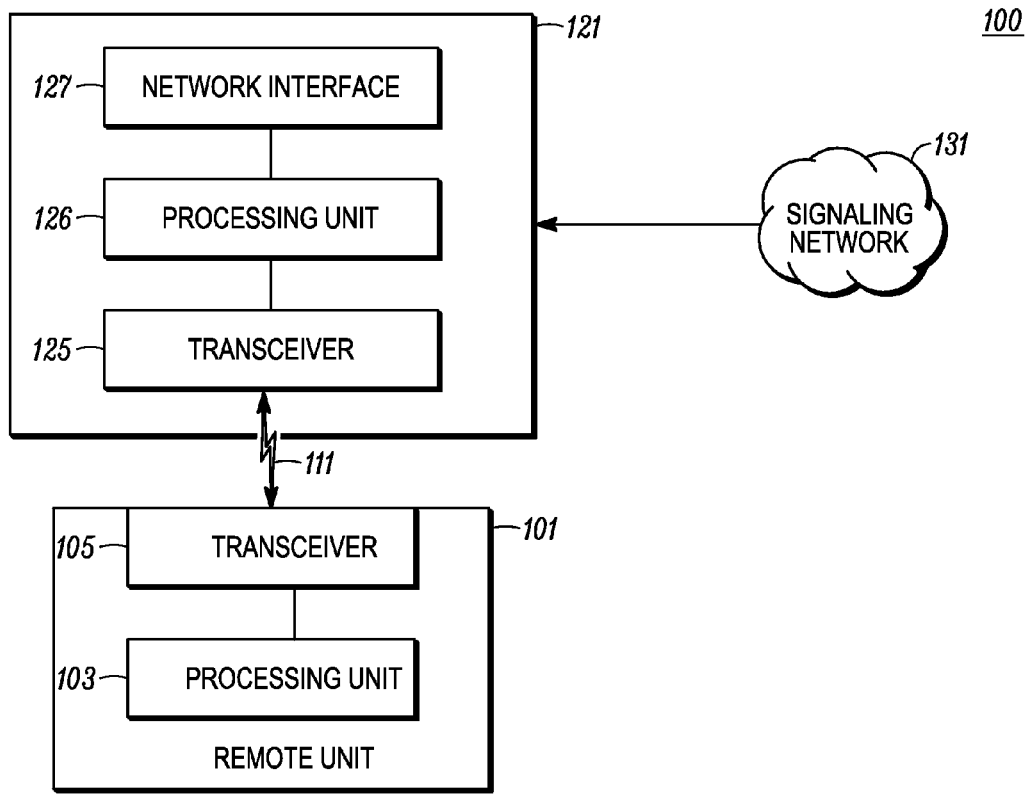
FIG. 4 is a block diagram depiction of a wireless communication system in accordance with multiple embodiments of the present invention.

The disclosed embodiments can be more fully understood with reference now to FIGS. 2-5. FIG. 4 is a block diagram depiction of a wireless communication system 100 in accordance with multiple embodiments of the present invention. At present, standards bodies such as OMA (Open Mobile Alliance), 3GPP (3rd Generation Partnership Project), 3GPP2 (3rd Generation Partnership Project 2), IEEE (Institute of Electrical and Electronics Engineers) 802, and WiMAX Forum are developing standards specifications for wireless telecommunications systems. Communication system 100 represents a system having an architecture in accordance with one or more of the WiMAX Forum and/or IEEE 802 technologies, suitably modified to implement the present invention. Alternative embodiments of the present invention may be implemented in communication systems that employ other or additional technologies such as, but not limited to, those described in the OMA, 3GPP, and/or 3GPP2 specifications.

Communication system 100 is depicted in a very generalized manner. For example, system 100 is shown to simply include remote unit 101, network node 121 and signaling network 131. Network node 121 is shown having interconnectivity via signaling network 131. Network node 121 is shown providing network service to remote unit 101 using wireless interface 111. The wireless interface used is in accordance with the particular access technology supported by network node 121, such as one based on IEEE 802.16. Those skilled in the art will recognize that FIG. 4 does not depict all of the physical fixed network components that may be necessary for system 100 to operate but only those system components and logical entities particularly relevant to the description of embodiments herein.

As depicted in FIG. 4, network node 121 comprises a processing unit 126, a network interface 127 and a transceiver 125. In general, components such as processing units, transceivers and network interfaces are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, device 121 represents a known device that has been adapted, in accordance with the description herein, to implement multiple embodiments of the present invention. Furthermore, those skilled in the art will recognize that aspects of the present invention may be implemented in or across various physical components and none are necessarily limited to single platform implementations. For example, a network node may be implemented in or across one or more RAN components, such as a base transceiver station (BTS) and/or a base station controller (BSC), a Node-B and/or a radio network controller (RNC), or an HRPD AN and/or PCF, or implemented in or across one or more access network (AN) components, such as an access service network (ASN) gateway and/or ASN base station (BS), an access point (AP), a wideband base station (WBS), and/or a WLAN (wireless local area network) station.

Remote unit 101 and network node 121 are shown communicating via technology-dependent, wireless interface 111. Remote units, subscriber stations (SSs) and/or user equipment (UEs), may be thought of as mobile stations (MSs), mobile subscriber stations (MSSs), mobile devices or mobile nodes (MNs). In addition, remote unit platforms are known to refer to a wide variety of consumer electronic platforms such as, but not limited to, mobile stations (MSs), access terminals (ATs), terminal equipment, mobile devices, gaming devices, personal computers, and personal digital assistants (PDAs). In particular, remote unit 101 comprises a processing unit (103) and transceiver (105). Depending on the embodiment, remote unit 101 may additionally comprise a keypad (not shown), a speaker (not shown), a microphone (not shown), and a display (not shown). Processing units, transceivers, keypads, speakers, microphones, and displays as used in remote units are all well-known in the art.

Operation of embodiments in accordance with the present invention occurs substantially as follows, first with reference to FIGS. 2-4. FIGS. 2 and 3 are logic flow diagrams of functionality performed respectively by a remote unit and a network node in accordance with multiple embodiments of the present invention. As depicted in FIG. 4, network node 121 is a current serving node for remote unit 101. Network node processing unit 126 transmits (32) via transceiver 125 signaling that indicates a set of spreading channel codes. This signaling may take the form of a group page message that targets remote unit 101 among other remote units that are not shown in FIG. 4.

Receiving (22) this signaling, remote unit processing unit 103 selects (23) a first spreading channel code from the set of spreading channel codes based on a channel quality of wireless interface 111. Depending on the embodiment, a Channel Quality Indication (CQI) value and/or signal strength value may be used as the channel quality for selection purposes. Processing unit 103 then transmits (24) via transceiver 105 an initial access signal using the first spreading channel code. Network node processing unit 126 receives (33) the initial access signal and transmits (34) via transceiver 125 a forward link assignment for a forward link referencing one of the spreading channel codes from the set of spreading channel codes.

Network node 121 then begins using this forward link to transmit (35) data to remote unit 101. Since the spreading channel code used by remote unit 101 indicates the channel quality with remote unit 101, network node 121 may use this indication (or an indication by a remote unit having a worse channel quality) to determine a power level at which to transmit data via the forward link. Also, network node 121 may use a pre-arranged encryption key to encrypt the forward link data. By using a pre-arranged encryption key and an indication of channel quality from the remote unit access signaling, network node 121 is able to begin transmitting forward data to the remote unit without waiting for further signaling exchanges.

After transmitting the initial access signal, remote unit 101 monitors the set of spreading channel codes originally indicated by network node 121 for the forward link assignment. Remote unit 101 receives (25) the assignment and then begins receiving (26) data via the forward link, decrypting the data using the pre-arranged encryption key. While proceeding to monitor for the assignment/receive data, remote unit 101 transmits (27) a subsequent access signal using a second spreading channel code in order to trigger the establishment of a private link associated with the forward link. The remote unit may delay a random amount of time before sending the subsequent access signal.

Receiving (36) the subsequent access signal, network node 121 transmits (37) signaling to establish a private link with remote unit 101. With a private link established, network node 121 and remote unit 101 may begin performing (28, 38) authentication signaling and/or power control signaling. Network node 121 may then adjust the forward link power level based on this private link power control signaling. Network node 121 may also transmit via the private link a new encryption key and begin using it to encrypt the forward link data.

Reference has been made to IEEE 802.16 embodiments above. Therefore, a summary that focuses on certain IEEE 802.16 embodiments appears below to provide some additional and more particular examples. They are intended to further the reader's understanding of the variety of possible embodiments rather than to limit the scope of the invention.

Figure 5:
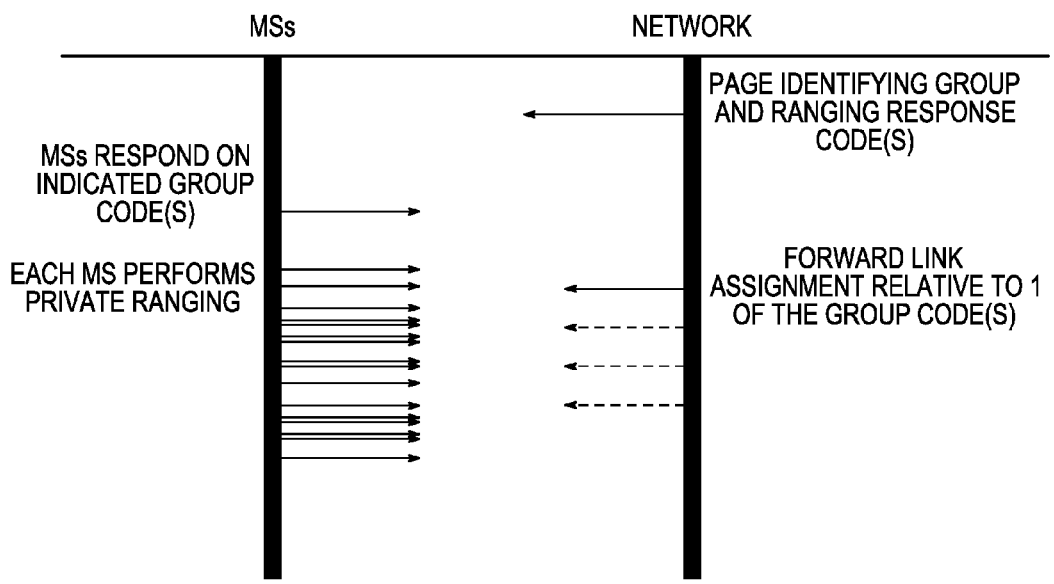
FIG. 5 is a signaling flow diagram that depicts signaling performed by a wireless communication system in accordance with certain embodiments of the present invention.

It may be helpful to step through a sequence of events as an example of how certain embodiments of the present invention may operate. FIG. 5 is a signaling flow diagram that depicts signaling performed by a wireless communication system in accordance with certain embodiments of the present invention. In diagram 500, the network sends a group page intended to reach a set of terminals in the area. In the page message, a set of ranging codes is given on which the terminals can respond. Each particular terminal chooses which ranging code to respond on based on its current CQI (Channel Quality Indication) value. (This enables the network to quickly determine the CQIs of all of the terminals that will be involved in the group call.) Note that a set of terminals having the same CQI can all respond on the uplink using the same ranging code and there is no collision since all are sending the same thing anyway.

After receiving the responses, the network sends a forward link assignment referencing one of the codes specified in the original page message. All the terminals involved look for an assignment message which uses any of the ranging codes specified by the original group page to address the terminals involved. The network then begins delivering data to the group using a pre-agreed-upon encryption key and using a power level which should be sufficient to reach the terminal having the worst CQI (or alternatively, a few dB greater than that to account for the fact that there is initially no fast feedback channel for power control should one of the terminal's wireless conditions worsen).

Each terminal in the group then performs a separate access using a different ranging code (not specified by the group page) and sets up a private channel between the terminal and network. The terminals attempt to setup these private links for power control and authentication in parallel with receiving the information already starting to flow on the common downlink used for the group call. Note that to avoid congestion, the various terminals wait a random time (from 0 to a certain max value) to perform the ranging necessary to setup the private link. Authentication and uplink power control are performed separately for each terminal on its private channel. After authentication is completed for all terminals, the network may then optionally begin using a different encryption key for the downlink data being sent to all the terminals. (This encryption key would have been informed to each terminal on its private link after authentication was completed.) The network can also now individualize power control (i.e., use the appropriate power level to reach the terminal with the worst CQI based on the CQI reports sent on the private links). In general, the network may use the private links for a variety of control functions (e.g., changing the traffic channel type between shared and unicast).

One of skill in the art will appreciate that various modifications and changes may be made to the specific embodiments described above with respect to FIGS. 1-5 without departing from the spirit and scope of the present invention. Thus, the discussion of certain embodiments in greater detail above is to be regarded as illustrative and exemplary rather than restrictive or all-encompassing, and all such modifications to the specific embodiments described above are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, and the like, are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the information or object being indicated. Some, but not all examples of techniques available for communicating or referencing the information or object being indicated include the conveyance of the information or object being indicated, the conveyance of an identifier of the information or object being indicated, the conveyance of information used to generate the information or object being indicated, the conveyance of some part or portion of the information or object being indicated, the conveyance of some derivation of the information or object being indicated, and the conveyance of some symbol representing the information or object being indicated. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for improving network access through multi-stage signaling comprising:
    receiving by a remote unit signaling from a network node, wherein the signaling indicates a set of spreading channel codes;
    selecting by the remote unit a first spreading channel code from the set of spreading channel codes based on a channel quality between the remote unit and the network node;
    transmitting by the remote unit an initial access signal using the first spreading channel code;
    receiving, by the remote unit from the network node, a forward link assignment for a forward link referencing one of the spreading channel codes from the set of spreading channel codes;
    receiving data from the network node via the forward link;
    transmitting by the remote unit a subsequent access signal using a second spreading channel code in order to trigger the establishment of a private link associated with the forward link; and
    performing at least one of authentication signaling and power control signaling via the private link.

2. The method of claim 1, wherein the signaling from the network node indicating the set of spreading channel codes comprises a group page message.

3. The method of claim 1, wherein selecting the first spreading channel code comprises
    selecting the first spreading channel code based on a Channel Quality Indication (CQI) value.

4. The method of claim 1, further comprising
monitoring for an assignment message from the network node referencing any one of the set of spreading channel codes.

5. The method of claim 1, further comprising
decrypting by the remote unit the data using a pre-arranged encryption key.

6. The method of claim 1, further comprising
delaying for a waiting period before transmitting the subsequent access signal, wherein the waiting period is a randomly determined amount of time.

7. The method of claim 1, further comprising
receiving via the private link a new encryption key;
receiving additional data from the network node via the forward link;
decrypting the additional data using the new encryption key.

8. A method for improving network access through multi-stage signaling comprising:
transmitting by a network node signaling to at least one remote unit, wherein the signaling indicates a set of spreading channel codes;
receiving by the network node an initial access signal from each of the at least one remote unit via a spreading channel code selected from the set of spreading channel codes, wherein each spreading channel code indicates a channel quality between that remote unit and the network node;
transmitting by the network node a forward link assignment for a forward link referencing one of the spreading channel codes from the set of spreading channel codes;
transmitting data to the at least one remote unit via the forward link;
receiving from the at least one remote unit a subsequent access signal;
transmitting by the network node signaling to establish a private link with each of the at least one remote units, each private link being associated with the forward link; and
performing at least one of authentication signaling and power control signaling with each of the at least one remote unit via each of the corresponding private links.

9. The method of claim 8, wherein the signaling from the network node indicating the set of spreading channel codes comprises a group page message.

10. The method of claim 8, further comprising
encrypting by the network node the data using a pre-arranged encryption key.

11. The method of claim 8, further comprising
transmitting via each private link a new encryption key;
encrypting additional data using the new encryption key;
transmitting the additional data from the network node via the forward link.

12. The method of claim 8, wherein transmitting data via the forward link comprises
determining a power level at which to transmit based on the worst channel quality indicated by the initial access signaling of the at least one remote unit.

13. The method of claim 8, further comprising
adjusting a power level at which to transmit via the forward link based on power control signaling via at least one of the private links.

14. The method of claim 13, wherein adjusting the power level at which to transmit via the forward link comprises
adjusting the power level based on the worst CQI value indicated via one of the private links.

15. The method of claim 8, wherein transmitting the forward link assignment referencing one of the spreading channel codes from the set of spreading channel codes comprises
indicating, to the at least one remote unit by which spreading channel code is referenced, a back-off delay for subsequent access signaling.

16. A remote unit for improving network access through multi-stage signaling, the remote unit comprising:
a transceiver;
a processing unit, communicatively coupled to the transceiver,
adapted to receive via the transceiver signaling from a network node, wherein the signaling indicates a set of spreading channel codes;
adapted to select a first spreading channel code from the set of spreading channel codes based on a channel quality between the remote unit and the network node;
adapted to transmit via the transceiver an initial access signal using the first spreading channel code;
adapted to receive, from the network node via the transceiver, a forward link assignment for a forward link referencing one of the spreading channel codes from the set of spreading channel codes;
adapted to receive data from the network node via the forward link and the transceiver;
adapted to transmit via the transceiver a subsequent access signal using a second spreading channel code in order to trigger the establishment of a private link associated with the forward link; and
adapted to perform at least one of authentication signaling and power control signaling via the transceiver and the private link.

17. A network node for improving network access through multi-stage signaling, the network node comprising:
a transceiver;
a processing unit, communicatively coupled to the transceiver,
adapted to transmit via the transceiver signaling to at least one remote unit, wherein the signaling indicates a set of spreading channel codes;
adapted to receive via the transceiver an initial access signal from each of the at least one remote unit via a spreading channel code selected from the set of spreading channel codes, wherein each spreading channel code indicates a channel quality between that remote unit and the network node;
adapted to transmit via the transceiver a forward link assignment for a forward link referencing one of the spreading channel codes from the set of spreading channel codes;
adapted to transmit data to the at least one remote unit via the transceiver and the forward link;
adapted to receive from the at least one remote unit a subsequent access signal via the transceiver;
adapted to transmit via the transceiver signaling to establish a private link with each of the at least one remote units, each private link being associated with the forward link; and
adapted to perform at least one of authentication signaling and power control signaling with each of the at least one remote unit via the transceiver and each of the corresponding private links.

* * * * *